United States Patent
Bixler

(10) Patent No.: US 11,815,149 B2
(45) Date of Patent: Nov. 14, 2023

(54) ELASTOMERIC BUSHING WITH TRAVEL LIMITER

(71) Applicant: The Pullman Company, Milan, OH (US)

(72) Inventor: Michael Bixler, Milan, OH (US)

(73) Assignee: The Pullman Company, Milan, OH (US)

( * ) Notice: Subject to any disclaimer, the term of this patent is extended or adjusted under 35 U.S.C. 154(b) by 242 days.

(21) Appl. No.: 17/320,811

(22) Filed: May 14, 2021

(65) Prior Publication Data

US 2022/0364623 A1    Nov. 17, 2022

(51) Int. Cl.
F16F 1/38    (2006.01)

(52) U.S. Cl.
CPC .......... *F16F 1/3835* (2013.01); *F16F 1/3842* (2013.01)

(58) Field of Classification Search
CPC ...... F16F 1/3814; F16F 1/3835; F16F 1/3842; F16F 1/3863; F16F 1/3873; F16F 15/08; F16C 27/063; F16C 31/02; F16C 33/74; F16C 33/102; F16C 33/1065; F16C 33/20; F16C 17/10; F16C 2326/05; B60G 21/0551; B60G 2204/41
USPC ........................................................ 267/141
See application file for complete search history.

(56) References Cited

U.S. PATENT DOCUMENTS

| | | | |
|---|---|---|---|
| 1,827,267 A * | 10/1931 | Short | B25B 27/28 403/228 |
| 5,397,112 A | 3/1995 | Roth et al. | |
| 9,732,816 B2 | 8/2017 | Conrad et al. | |
| 2004/0084822 A1 | 5/2004 | Collyer et al. | |
| 2005/0161872 A1* | 7/2005 | Bjorkgard | B60G 9/022 267/293 |
| 2005/0258583 A1* | 11/2005 | Schnaars | F16F 1/3863 267/293 |

(Continued)

FOREIGN PATENT DOCUMENTS

| DE | 102017111667 A1 | 11/2018 |
|---|---|---|
| EP | 1878937 B1 | 8/2008 |

(Continued)

OTHER PUBLICATIONS

International Search Report and Written Opinion regarding Patent Application No. PCT/US2022/027362, dated Aug. 16, 2022.

*Primary Examiner* — Robert A. Siconolfi
*Assistant Examiner* — San M Aung
(74) *Attorney, Agent, or Firm* — Harness, Dickey & Pierce, P.L.C.

(57) ABSTRACT

An elastomeric bushing comprises an inner sleeve, an elastomeric bumper disposed around and directly engaging the inner sleeve, and an outer sleeve disposed around the inner sleeve and the elastomeric bumper. The outer sleeve is spaced apart from the inner sleeve and directly engages the elastomeric bumper. The inner sleeve includes a first protrusion and a second protrusion axially spaced apart from one another. The outer sleeve includes a radially inwardly extending indentation axially positioned between the first protrusion and the second protrusion. The indentation traps a first portion of the elastomeric bumper between the first protrusion and a first surface of the indentation and also traps a second portion of the elastomeric bumper between the second protrusion and a second surface of the indentation.

16 Claims, 3 Drawing Sheets

(56) References Cited

U.S. PATENT DOCUMENTS

| | | | | |
|---|---|---|---|---|
| 2007/0235912 | A1* | 10/2007 | Sato | F16F 13/1445 |
| | | | | 267/140.13 |
| 2009/0166506 | A1* | 7/2009 | Ahmed | B60K 5/1208 |
| | | | | 248/634 |
| 2016/0369860 | A1* | 12/2016 | Trotter | F16F 1/3828 |
| 2017/0166025 | A1* | 6/2017 | Auten | B60G 11/12 |
| 2020/0124088 | A1 | 4/2020 | Firszt et al. | |
| 2020/0393017 | A1* | 12/2020 | Axman | F16F 1/3835 |
| 2022/0042567 | A1* | 2/2022 | Geisen | F16F 1/38 |

FOREIGN PATENT DOCUMENTS

| | | |
|---|---|---|
| JP | 4261587 B2 | 4/2009 |
| KR | 10-2018-0068066 A | 6/2018 |
| WO | WO-2020070069 A1 | 4/2020 |

\* cited by examiner

ELASTOMERIC BUSHING WITH TRAVEL LIMITER

FIELD

The present disclosure relates to an elastomeric bushing which secures a component to a vehicle. More particularly, the present disclosure relates to an elastomeric bushing for attaching a component to a vehicle where the elastomeric bushing includes an internal axial travel limiter.

BACKGROUND

The statements in this section merely provide background information related to the present disclosure and may not constitute prior art.

Automobile, truck, bus and other applications are commonly designed using an independent front and/or an independent rear suspension system to connect the chassis of the vehicle (the unsprung portion) and the body of the vehicle (the sprung portion). The independent suspension systems normally include an upper control arm, a lower control arm and a hub or knuckle which supports the tire of the vehicle. Each control arm is attached to the frame or other structural component of the vehicle using one or more elastomeric bushings. The elastomeric bushings may consist of an outer metal tube which is pressed into the control arm. A layer of elastomer is positioned within the outer metal housing and an inner metal housing which extends through the center of the layer of elastomer. The inner metal housing is attached to a bracket on the frame. The supporting structure or the sprung portion of the vehicle or a bolt extends through the inner metal and secures the end of the control arm to the frame. As the vehicle travels, relative movement between the sprung and unsprung portions of the vehicle is accommodated by flexing of a coil spring, a torsion bar, an air spring or by another resilient device. The flexing of the resilient device causes the ends of the control arms to pivot on both of the elastomeric bushings which secure the control arms to the sprung portion of the vehicle.

The elastomeric bushings are used to facilitate this pivotal motion and to isolate the vehicle from shock. The layer of elastomer located between the inner and outer metal housings effectively isolates the sprung portion of the vehicle from the unsprung portion of the vehicle. In certain high load applications, the ends of the outer metal are curved or formed over toward the inner metal in order to further encapsulate the layer of elastomeric material. The curving or forming of the ends and thus the further encapsulating of the layer of elastomeric material increases the radial spring rate, increases the axial spring rate, it improves the axial retention and improves the durability of the bushing.

While these elastomeric bushings have performed satisfactorily in the field, a need for an alternate design exists. It may be beneficial to develop an elastomeric bushing including an internal travel limiter that defines the maximum amount of axial travel between an inner sleeve and an outer sleeve. It may be beneficial to achieve such a function using internal geometry of the elastomeric bushing without relying on elastomeric material being positioned external to the bushing components to expand the capabilities of the elastomeric bushing, improve the strength and durability of the bushing while minimizing manufacturing costs associated with the new elastomeric bushing.

SUMMARY

This section provides a general summary of the disclosure, and is not a comprehensive disclosure of its full scope or all of its features.

An elastomeric bushing comprises an inner sleeve, an elastomeric bumper disposed around and directly engaging the inner sleeve, and an outer sleeve disposed around the inner sleeve and the elastomeric bumper. The outer sleeve is spaced apart from the inner sleeve and directly engages the elastomeric bumper. The inner sleeve includes a first protrusion and a second protrusion axially spaced apart from one another. The outer sleeve includes a radially inwardly extending indentation axially positioned between the first protrusion and the second protrusion. The indentation traps a first portion of the elastomeric bumper between the first protrusion and a first surface of the indentation and also traps a second portion of the elastomeric bumper between the second protrusion and a second surface of the indentation.

A method of manufacturing an elastomeric bushing, comprises providing an inner sleeve with a first protrusion and a second protrusion axially spaced apart from one another, positioning an elastomeric bumper around and in direct engagement with the inner sleeve, and axially inserting the inner sleeve and the elastomeric bumper within an outer sleeve. The outer sleeve directly engages and compresses the elastomeric bumper and is spaced apart from the inner sleeve. The method further comprises deforming the outer sleeve to define a radially inwardly extending indentation axially positioned between the first protrusion and the second protrusion. The indentation compresses a first portion of the elastomeric bumper between the first protrusion and a first surface of the indentation. The indentation also compresses a second portion of the elastomeric bumper between the second protrusion and a second surface of the indentation.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
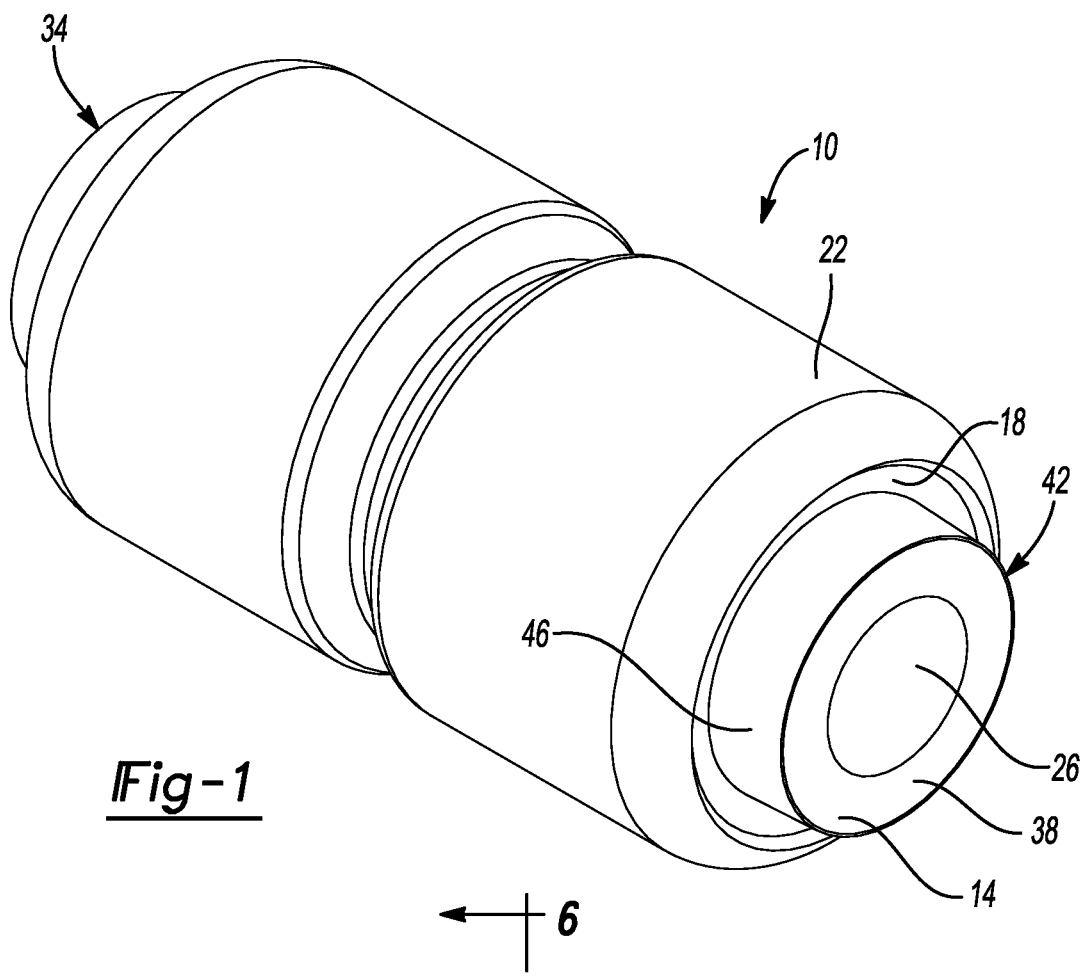
FIG. 1 is a perspective view of an exemplary elastomeric bushing constructed in accordance with the teachings of the present disclosure.
Figure 2:
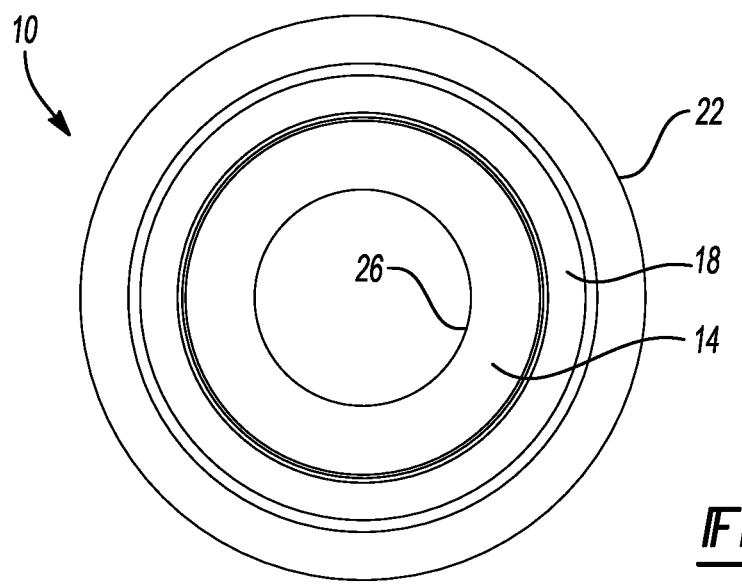
FIG. 2 is an end view of the elastomeric bushing depicted in FIG. 1.

An exemplary embodiment elastomeric bushing will now be described more fully with reference to the accompanying drawings with the elastomeric bushing being identified at reference numeral 10.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items. Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIGS. 1-6, elastomeric bushing 10 is an assembly comprising an inner sleeve 14, elastomeric bumper 18, and an outer sleeve 22. Inner sleeve 14 is illustrated as a metal tube having a generally circular cylindrical shape. It is within the scope of the present disclosure to have different inner sleeves, including but not limited to, a solid tubular component. In the embodiment depicted in the figures, inner sleeve 14 includes a substantially cylindrical through bore 26 extending through the first end face 30 positioned at a first end 34 through a second end face 38 positioned at a second end 42 opposite first end 34.

A majority of inner sleeve 14 includes a cylindrically shaped outer surface 46. A first protrusion 50 radially outwardly extends from outer surface 46. A second protrusion 54 is shaped substantially the same as first protrusion 50 and also radially outwardly extends from outer surface 46. In the embodiment depicted in the figures, first protrusion 50 and second protrusion 54 are integrally formed with the remainder of inner sleeve 14 such that inner sleeve 14 is a one-piece monolithic component. Each protrusion 50, 54 circumferentially extends about inner sleeve 14. The cross-sectional shape of each protrusion 50, 54 may be shaped as a torus or a tooth having a first sloped side 58 and a symmetrically arranged second sloped side 62 intersecting at a curved peak 66. Second protrusion 54 includes a first sloped side 70 and a second sloped side 74 intersecting at a peak 78.

Figure 3:
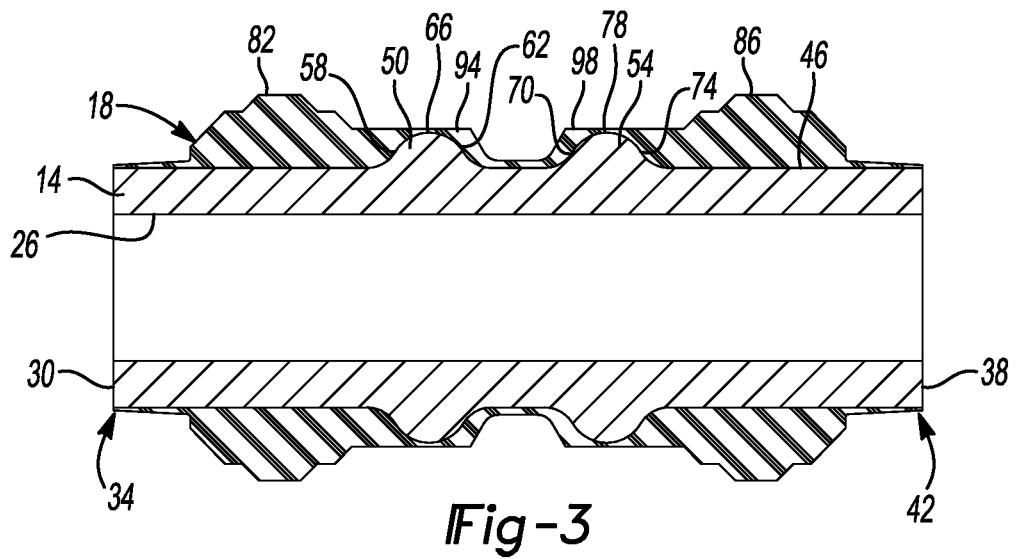
FIG. 3 is a cross-sectional view taken through an inner sleeve with an elastomeric bumper attached thereto, prior to insertion within an outer sleeve.
Figure 4:
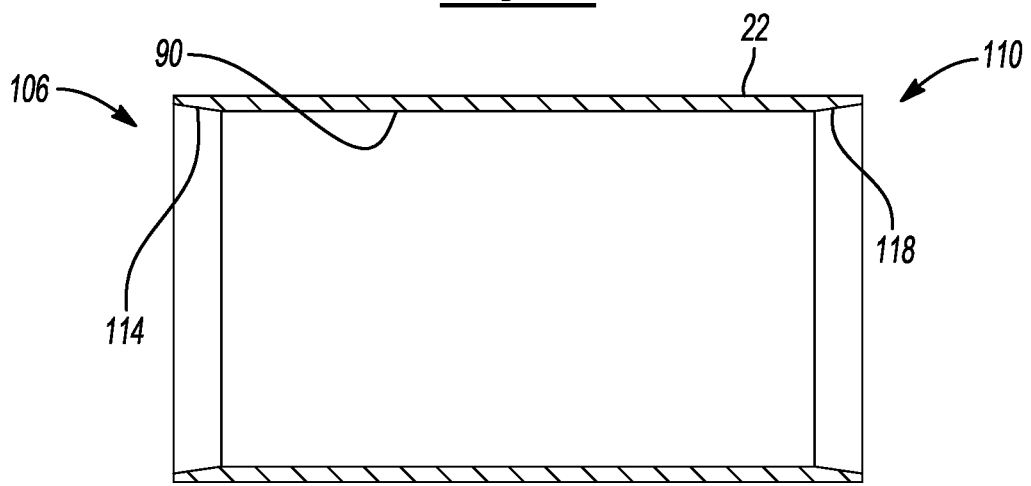
FIG. 4 is a cross-sectional through an un-deformed outer sleeve.

FIG. 3 depicts a work-in-process level assembly of elastomeric bumper 18 bonded to outer surface 46 of inner sleeve 14. In FIG. 4, elastomeric bumper 18 is shown in an as-molded, unloaded free state prior to insertion within outer sleeve 22. Elastomeric bumper 18 includes a first radially outwardly extending portion 82 and a second radially outwardly extending portion 86 axially spaced apart therefrom. It should be appreciated that the radial extent of portions 82, 86 exceed that of an inner diameter defined by an inner surface 90 of outer sleeve 22 when outer sleeve 22 is in and un-deformed work-in-process state as shown in FIG. 4.

Figure 5:
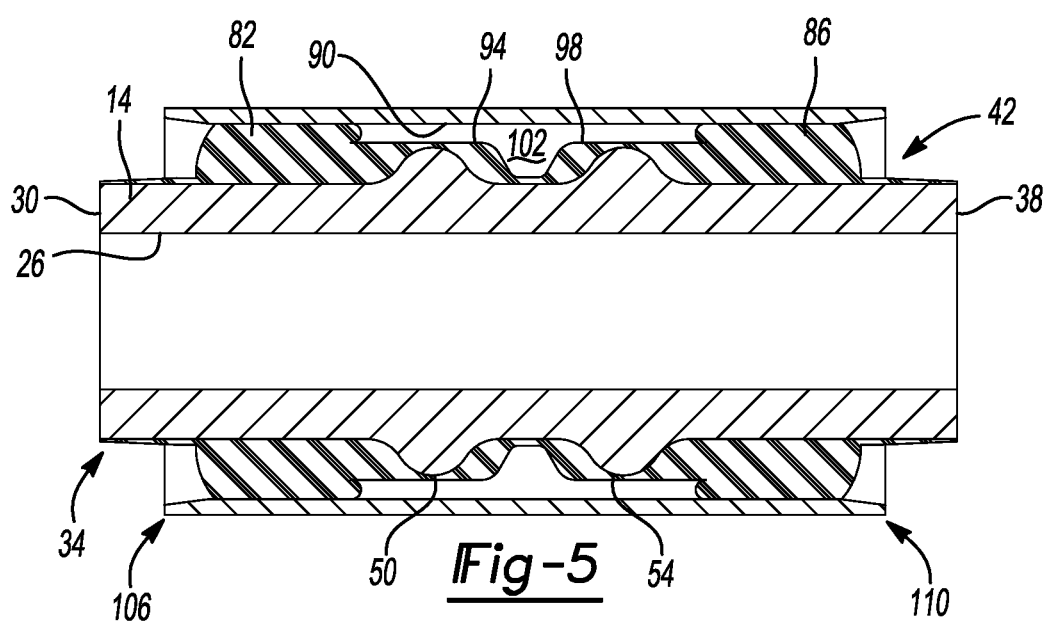
FIG. 5 is a cross-sectional view taken through a sub-assembly of the inner sleeve with attached elastomeric bumper positioned within the un-deformed outer sleeve.

Elastomeric bumper 18 includes an intermediate centralized first portion 94 and an intermediate centralized second portion 98 axially spaced apart from one another and positioned proximate first protrusion 50 and second protrusion 54, respectively. The extent to which first and second portions 94 and 98 radially outwardly extend is less than the inner diameter of outer sleeve 22 as defined by inner surface 90. As such, when the subassembly of inner sleeve 14 and bonded elastomeric bumper 18 is inserted within outer sleeve 22, as shown in FIG. 5, portions 82 and 86 are radially compressed into engagement with inner surface 90 while first and second portions 94, 98 remain spaced apart from inner surface 90. Accordingly, an annular gap 102 axially extends between the compressed configuration of first radially outwardly extending portion 82 and second radially outwardly extending portion 86.

Figure 6:
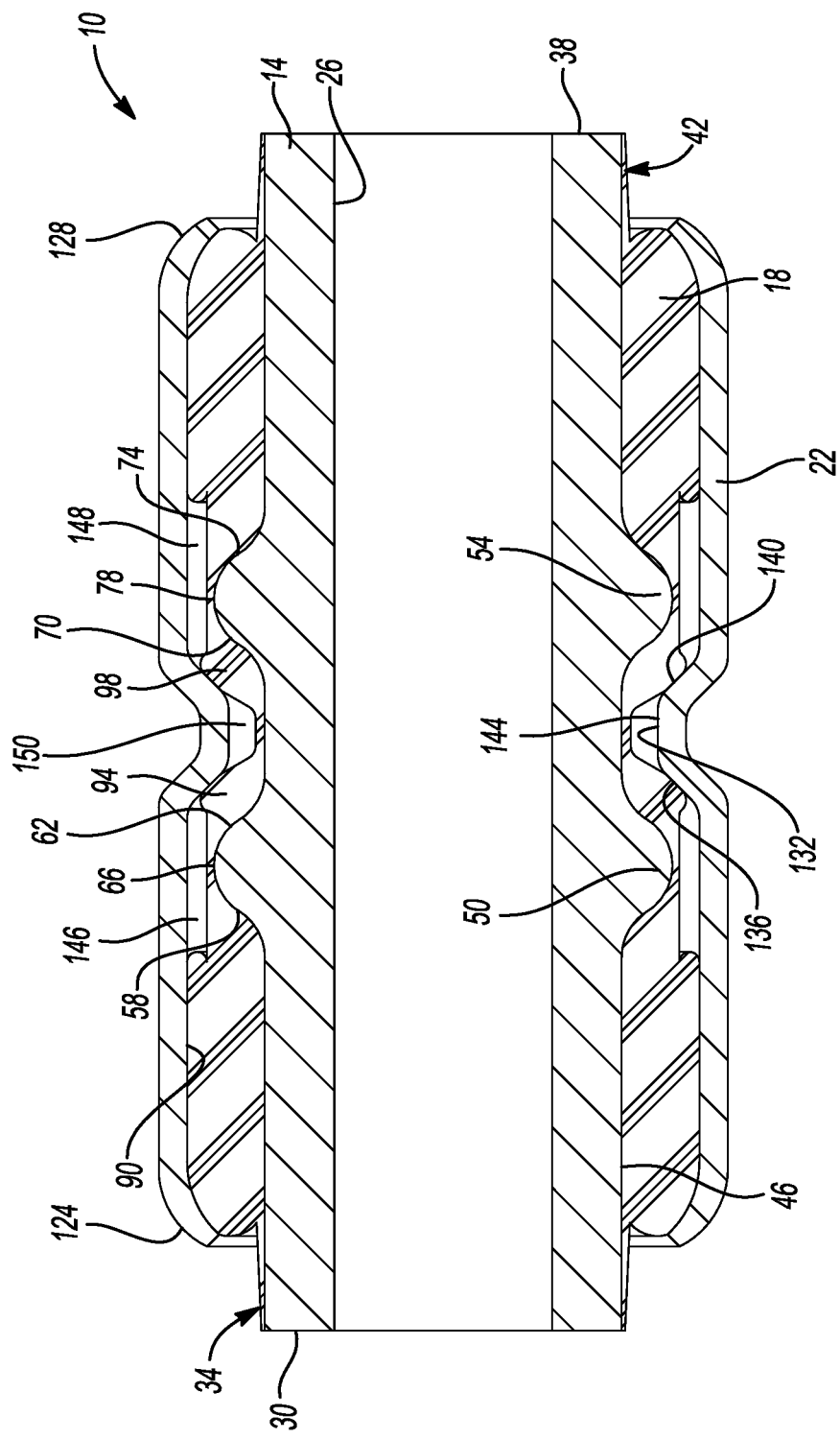
FIG. 6 is a cross-sectional view of the elastomeric bushing.

As best shown in FIGS. 5 and 6, outer sleeve 22 is a substantially cylindrically-shaped tube having a constant inner diameter for the vast majority of its axial length. Opposite open ends of outer sleeve 22 may include a tapered conical lead to facilitate insertion of the subassembly including inner sleeve 14 and bonded elastomeric bumper 18. For example, the embodiment in the figures shows outer sleeve 22 including a first end 106 and an opposite second end 110.

A first internal conical lead 114 is provided at first end 106 and a second internal conical lead 118 is provided at second end 110 to define a symmetrical work-in-process sleeve 22. The subassembly of inner sleeve 14 and bonded elastomeric bumper 18 may be inserted into either end of outer sleeve 22. The tapered internal entryways facilitate ease of assembly.

After the subassembly of inner sleeve 14 and bonded elastomeric bumper 18 of FIG. 3 has been inserted into the work-in-process outer sleeve depicted in FIG. 4, the resultant work-in-process subassembly depicted in FIG. 5 results.

FIG. 6 represents the finalized elastomeric bushing 10 having additional processes performed to the subassembly shown in FIG. 5. More particularly, first end 106 and second end 110 of outer sleeve 22 are mechanically inwardly deformed to crimp the ends of outer sleeve 22 over elastomeric bumper 18. The crimping or mechanical deformation process defines a first curled end 124 and a second curled end 128 which at least partially compress localized portions of elastomeric bumper 18 and provide resistance to relative axial movement between outer sleeve 22 and elastomeric bumper 18.

An indentation 132 is defined by mechanically deforming outer sleeve 22 radially inwardly in the centralized portion of the outer sleeve 22. Indentation 32 is axially positioned between first protrusion 50 and second protrusion 54. Indentation 132 radially inwardly extends an extent to engage first portion 94 and second portion 98 of elastomeric bumper 18 thereby placing the first and second portions in compression even when elastomeric bushing 10 is in a free, unload state.

Indentation 132 includes a first angled surface 136 and a second angled surface 140 interconnected by a crest 144. First angled surface 136 faces second sloped side 62 and traps first portion 94 therebetween. Similarly, second angled surface 140 faces first sloped side 70 and traps second portion 98 of elastomeric bumper 18 therebetween. Based on the angle of the opposing surfaces 62, 136 and 140, 70, first portion 94 and second portion 98 are further loaded in compression when external loading on elastomeric bumper 18 urges inner sleeve 14 to move axially relative to outer sleeve 22. First and second portions 94, 98 act as travel limiters.

It should be appreciated that these new geometrical features do not load elastomeric bumper 18 merely in shear, as is known in previous designs, but include first and second portions 94, 98 of elastomeric bumper 18 that are loaded in compression to limit relative axial displacement between inner sleeve 14 and outer sleeve 22. As the load applied to elastomeric bushing 10 increases and relative axial movement between inner sleeve 14 and outer sleeve 22 is attempted to be increased, one of the first and second portions 94, 98 will be placed in increased compression. The load generated in resistance to compression increases exponentially and effectively acts as the previously described travel limiter. The load required to axially move outer sleeve 22 relative to inner sleeve 14 is based on the elastomeric compressive properties of elastomeric bumper 18 as well as the component geometry previously described.

It should be noted that after indentation 132 has been formed, annular gap 102 is partitioned. A first gap 146 exists between inner surface 90 and first portion 94. Similarly, a second gap 148 circumferentially extends about elastomeric bumper 18 between second portion 98 and inner surface 90. A central gap 150 remains present between crest 144 and elastomeric bumper 18 after curled ends 124, 128 and indentation 132 have been formed.

It has been found that the rate of load per unit relative displacement between inner sleeve 14 and outer sleeve 22 may be varied based on the geometry of protrusions 50, 54, size and shape of first and second portions 94, 98 of elastomeric bumper 18, the size, shape and radial inward extent of indentation 132 as well as the size and shape of gaps 146, 148 150. A designer of elastomeric bushings may vary these parameters to tune the response characteristics of elastomeric bushing 10 to a particular application. Beneficially, the portions of elastomeric bumper 18 that define the travel limiter are positioned within the confines of outer sleeve 22. A design application engineer need not be concerned with the travel limiter being exposed to the environment outside of outer sleeve 22.

From a manufacturing standpoint, inner sleeve 14 may be constructed from a mild steel such SAE 1008-1035. It is envisioned that protrusions 50, 54 are cold formed as integral portions of inner sleeve 14. Elastomeric bumper 18 may be constructed from a natural rubber or other suitable elastomeric material. Outer sleeve 22 may include a mild steel such as SAE 1008, SAE 1010, or SAE 1020.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. Modifications and variations of the present disclosure are possible in light of the above teachings and may be practiced otherwise than as specifically described while within the scope of the appended claims.

What is claimed is:

1. An elastomeric bushing comprising:
an inner sleeve;
an elastomeric bumper disposed around and directly engaging the inner sleeve; and
an outer sleeve disposed around the inner sleeve and the elastomeric bumper, the outer sleeve being spaced apart from the inner sleeve and directly engaging the elastomeric bumper, wherein the inner sleeve includes a first protrusion and a second protrusion axially spaced apart from one another,
the outer sleeve including a radially inwardly extending indentation axially positioned between the first protrusion and the second protrusion,
the indentation trapping a first portion of the elastomeric bumper between the first protrusion and a first surface of the indentation, the indentation trapping a second portion of the elastomeric bumper between the second protrusion and a second surface of the indentation,
wherein the elastomeric bumper includes third and fourth portions axially spaced apart from one another on opposite sides of the indentation, the third and fourth portions being in engagement with and compressed by an inner surface of the outer sleeve,
wherein the elastomeric bumper includes an un-deformed central portion positioned axially between the first and second portions, a first gap existing between the central portion and the inner surface of the outer sleeve, and a second gap between the elastomeric bumper and the inner surface of the outer sleeve at an axial location between the first portion and the third portion.

2. The elastomeric bushing according to claim 1, wherein the inner sleeve is hollow cylindrically-shaped one-piece monolithic component including the first and second protrusions.

3. The elastomeric bushing according to claim 1, wherein the first and second protrusions have the same cross-sectional shape.

4. The elastomeric bushing according to claim 1, wherein the elastomeric bumper is bonded to the inner sleeve.

5. The elastomeric bushing according to claim 1, wherein the inner sleeve is coaxially aligned with the outer sleeve.

6. The elastomeric bushing according to claim 1, wherein the first surface of the indentation is opposed to and faces a sloped surface of the first protrusion.

7. The elastomeric bushing according to claim 6, wherein the second surface of the indentation is opposed to and faces a sloped surface of the second protrusion.

8. The elastomeric bushing according to claim 7, wherein the first surface of the indentation and the second surface are interconnected at a crest of the indentation.

9. The elastomeric bushing according to claim 8, wherein the crest of the indentation is spaced apart from the elastomeric bumper.

10. The elastomeric bushing according to claim 1, wherein the inner sleeve axially extends beyond the outer sleeve at each end of the outer sleeve.

11. The elastomeric bushing according to claim 1, wherein opposite ends of the outer sleeve are inwardly deformed in engagement with the elastomeric bumper.

12. The elastomeric bushing according to claim 1, wherein the indentation radially inwardly extends to load the first portion and the second portion of the elastomeric bumper in compression when the elastomeric bushing is in an unloaded state.

13. The elastomeric bushing according to claim 1, wherein a load attempting to axially move the outer sleeve relative to the inner sleeve increases exponentially based on the elastomeric compressive properties of the first and second portions of the elastomeric bumper.

14. A method of manufacturing an elastomeric bushing, comprising:
providing an inner sleeve with a first protrusion and a second protrusion axially spaced apart from one another;
positioning an elastomeric bumper around and in direct engagement with the inner sleeve;
axially inserting the inner sleeve and the elastomeric bumper within an outer sleeve, the outer sleeve directly engaging and compressing the elastomeric bumper as well as being spaced apart from the inner sleeve;
deforming the outer sleeve to define a radially inwardly extending indentation axially positioned between the first protrusion and the second protrusion, wherein the indentation compresses a first portion of the elastomeric bumper between the first protrusion and a first surface of the indentation, the indentation also compressing a second portion of the elastomeric bumper between the second protrusion and a second surface of the indentation; and
defining a gap between an inner surface of the outer sleeve and the elastomeric bumper after the deforming step has been completed.

15. The method of claim 14, further comprising mechanically deforming opposite ends of the outer sleeve toward the inner sleeve.

16. The method of claim 14, further comprising coaxially aligning the inner sleeve and the outer sleeve.

* * * * *